United States Patent
Anamizu et al.

(10) Patent No.: US 6,177,536 B1
(45) Date of Patent: Jan. 23, 2001

(54) METHOD FOR QUENCHING OF CATALYST IN THE PRODUCTION OF LOW MOLECULAR WEIGHT POLYCARBONATES

(75) Inventors: Takayoshi Anamizu, Chiba; Akio Kanezawa, Sodegaura; Tomoaki Shimoda, Ichihara, all of (JP); Raphael Mestanza, Saint Riquier es Plains (FR)

(73) Assignee: General Electric Company, Schenectady, NY (US)

( * ) Notice: Under 35 U.S.C. 154(b), the term of this patent shall be extended for 0 days.

(21) Appl. No.: 09/255,147

(22) Filed: Feb. 22, 1999

(51) Int. Cl.$^7$ .................................................. C08G 64/02
(52) U.S. Cl. .......................... 528/196; 528/176; 528/198
(58) Field of Search .................................... 528/176, 196, 528/198

(56) References Cited

U.S. PATENT DOCUMENTS

| | | | |
|---|---|---|---|
| 5,403,878 | 4/1995 | Ishiwa et al. | 524/158 |
| 5,418,269 | 5/1995 | Ishiwa et al. | 524/315 |
| 5,606,007 | 2/1997 | Sakashita et al. | 528/176 |

*Primary Examiner*—Terressa M. Boykin

(57) ABSTRACT

Improved performance in high temperature, high vacuum reactors is obtained by quenching alkaline catalyst present in the product a melt polycondensation reaction using a sulfonic acid ester quencher in a carrier. The carrier if formed from a first carrier component effective to solubilize the quencher and having a lower boiling point than the quencher, and a second carrier component soluble in the first carrier component and having a higher boiling point than the quencher. An exemplary carrier composition contains equal parts of diphenylcarbonate and toluene.

21 Claims, 2 Drawing Sheets

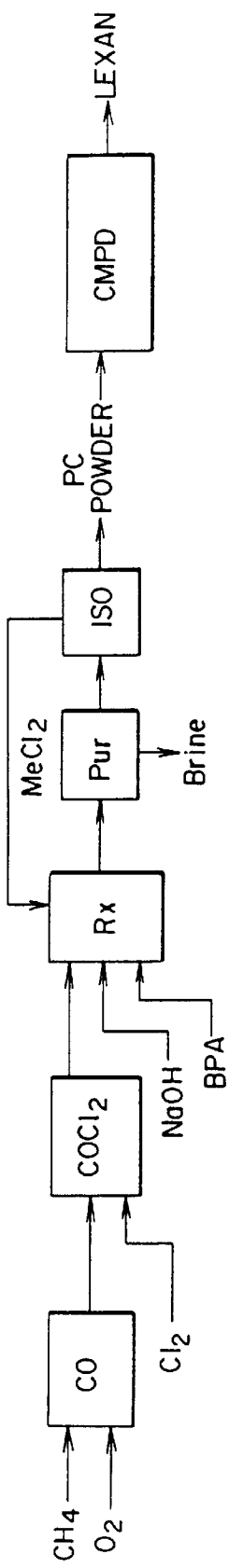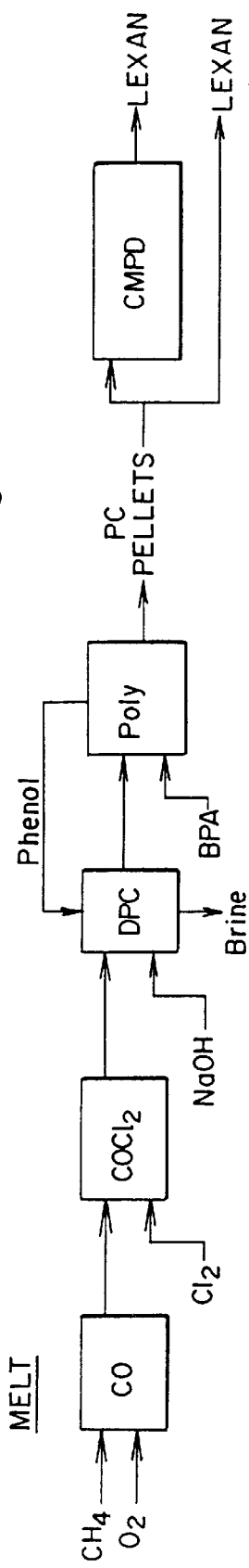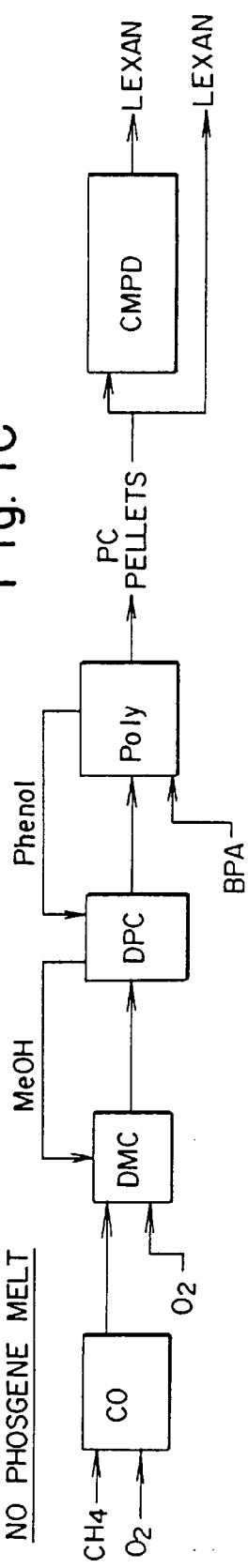

METHOD FOR QUENCHING OF CATALYST IN THE PRODUCTION OF LOW MOLECULAR WEIGHT POLYCARBONATES

This application relates to the manufacture of polycarbonates via a melt polycondensation reaction, and in particular to an improved method for finishing such compositions through the addition of a quenching agent to neutralize the alkaline condensation catalyst.

Aromatic polycarbonates are useful in a great many applications because of their desirable physical properties, including strength and optical clarity. There are three processes known for the production of aromatic polycarbonates, which are illustrated in FIG. 1. The conventional interfacial process and the phosgene-based melt process start with the reaction of phosgene with carbon monoxide. The "no phosgene" melt process was developed to eliminate the use of highly toxic phosgene in the reaction process.

Both types of melt processes make use of a diarylcarbonate such as diphenylcarbonate (DPC) as an intermediate, which is polymerized with a dihydric phenol such as bisphenol A (BPA) in the presence of an alkaline catalyst to form a polycarbonate in accordance with the general reaction shown in FIG. 2. This polycarbonate may be extruded or otherwise processed, and may be combined with additives such as dyes and UV stabilizers. In many cases, however, the presence of residual catalyst has a detrimental effect on the quality of the product, leading to poor color, molecular weight or rheological properties. Residual catalyst may also interact with additives, detracting from their efficacy. Thus, it is desirable to reduce the levels of residual catalyst to minimize these interactions. Such reduction is referred to as "quenching."

In the production of optical quality polycarbonates, several reactors are used in sequence to prepare the final product. The fourth and final reactor in this sequence subjects the reaction mixture to both high temperature and high vacuum. This treatment assists in the removal of unreacted monomer and short oligomers, and improves the overall quality of the final product. For optical quality (OQ) products, this is also the phase of the reaction at which quencher is added. Because of the very small amount of actual quencher which is required, the quencher is conventionally added in a solvent. For example, the assignee company has made use of toluene as a solvent for the delivery of n-butyl tosylate as a quencher. Unfortunately, this system negatively impacts on the process for the continuous production of OQ polycarbonates, because decomposition occurs in the nozzle, which results in fluctuating flow rates.

It would therefore be desirable to have an alternative system for quenching polycarbonate reactions that occur at high temperature and vacuum, which does not suffer from this drawback. It is an object of the present invention to provide such a system.

SUMMARY OF THE INVENTION

The present invention provides a method for quenching alkaline catalyst present in the product of a melt polycondensation reaction, comprising adding to the product a sulfonic acid ester quencher in a carrier. The carrier comprises a first carrier component effective to solubilize the quencher and having a lower boiling point than the quencher, and a second carrier component soluble in the first carrier component and having a higher boiling point than the quencher. An exemplary carrier composition contains equal parts of diphenylcarbonate and toluene.

BRIEF DESCRIPTION OF THE DRAWINGS

FIG. 1 shows three alternative processes for production of polycarbonate; and

DETAILED DESCRIPTION OF THE INVENTION

Figure 2:
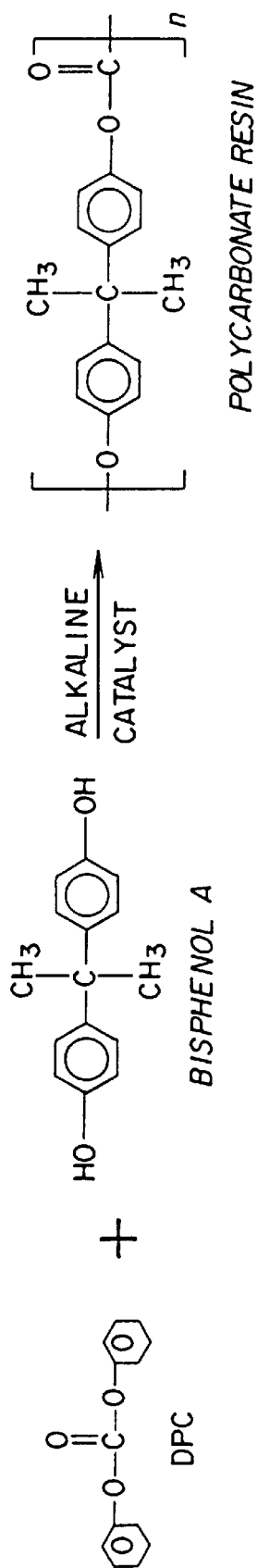
FIG. 2 shows the reaction carried out in a base-catalyzed melt polycondensation reaction.

The present invention provides an improved methodology for the addition of quencher to the product of a melt condensation reaction under conditions of high temperature and high vacuum. It will be appreciated by persons skilled in the art that variation in temperature and vacuum levels occurs depending on the nature of the apparatus employed and the product desired. In general, however, the term "high temperature" as used herein refers to temperatures greater than 260° C., and preferably in the range of about 270 to 310° C.; the term "high vacuum" refers to pressures of less than about 0.8 torr, and preferably in the range of about 0.2 to 0.6 torr.

In accordance with the invention, finished polycarbonates are made by adding a quencher composition to the product of a melt polycondensation reaction. The quencher compositions comprises a sulfonic acid ester (e.g. alkyl tosylate) quencher in a carrier comprising first and second carrier components. The amount of quencher in the quencher composition can be varied over a substantial range, since the carrier acts primarily as a diluent to facilitate uniform addition of small amounts of quencher to the product of the melt polycondensation reaction. Quencher compositions with higher concentrations of quencher can be used in smaller amounts, while quencher compositions with lower quencher concentrations are used in larger amounts to arrive at the same final levels of quencher. In general, the level of quencher in the quencher composition will be from about 0.1 to 10% by volume, preferably around 1%.

The two carrier components together provide a carrier which effectively delivers the quencher to the product of the melt polycondensation reaction without the aforementioned processing difficulties. The first carrier component is a low boiling point solvent (lower boiling point than the quencher), which is capable of solubilizing the sulfonic acid ester quencher but which is essentially unreactive with the polycondensation product under conditions of high temperature and high vacuum. Examples of specific materials suitable for use as the first carrier component include xylene, toluene, benzene, chlorobenzene, anisole and ethylbenzene.

The second component is selected to have a higher boiling point than the sulfonic acid quencher, and to be soluble in the first component. This second component will frequently be a component of the melt condensation reaction, thus avoiding the introduction of impurities. Thus, suitable materials for use as the second component include diphenylcarbonate, phenol, bisphenol A (BPA), polycarbonate oligomers, BPA derivatives and propylene carbonate.

The first and second components are combined in the quencher compositions used in the invention is ratios of from about 4:1 to 1:4, preferably around 1:1. The resulting quencher composition is injected into a stream of melt polycondensation reaction product and processed (for example by extrusion) to disperse the quencher composition throughout the melt. The resulting products are high quality polycarbonate, and processing proceeds without the instabilities in flow rate observed when only the low-boiling solvent is utilized.

COMPARATIVE EXAMPLE

A liquid solution at room temperature containing 1 part n-butyl tosylate and 99 parts toluene was injected at a rate of 2.65 kg/hr into a pipeline in the upper stream of a melt polycarbonate continuous reactor operating at 285° C. and 0.4 torr. Polycarbonate throughput was 4000 kg/hr, and the level of alkaline catalyst (NaOH) was $1 \times 10^{-6}$ mole/mole BPA. Thus, the quencher was added in a 6-fold excess relative to NaOH. After one day of operation, instabilities in flow rate were observed due to the deposition of coal tar-like decomposition products of the quencher at the feeding nozzle.

EXAMPLE

A liquid solution at room temperature containing 1 part n-butyl tosylate, 50 parts diphenylcarbonate and 50 parts toluene was injected at a rate of 2.65 kg/hr into a pipeline in the upper stream of a melt polycarbonate continuous reactor operating at 285° C. and 0.4 torr. Polycarbonate throughput was 4000 kg/hr, and the level of alkaline catalyst (NaOH) was $1 \times 10^{-6}$ mole/mole BPA. Thus, the quencher was added in a 6-fold excess relative to NaOH. After several days of operation, no instabilities in flow rate were observed. The vacuum level in the reaction remained unchanged.

What is claimed is:

1. A method for quenching alkaline catalyst present in the product of a melt polycondensation reaction, comprising adding to the product a sulfonic acid ester quencher in a carrier comprising a first carrier component effective to solubilize the quencher and having a lower boiling point than the quencher, and a second carrier component soluble in the first carrier component and having a higher boiling point than the quencher.

2. The method of claim 1, wherein the sulfonic acid ester quencher is n-butyl tosylate.

3. The method of claim 1, wherein the second carrier component is selected from the group consisting of diphenylcarbonate, phenol, bisphenol A (BPA), polycarbonate oligomers, BPA derivatives and propylene carbonate.

4. The method of claim 1, wherein the first carrier component is selected from the group consisting of xylene, toluene, benzene, chlorobenzene, anisole and ethylbenzene.

5. The method of claim 4, wherein the second carrier component is selected from the group consisting of diphenylcarbonate, phenol, bisphenol A (BPA), polycarbonate oligomers, BPA derivatives and propylene carbonate.

6. The method of claim 5, wherein the sulfonic acid ester quencher is n-butyl tosylate.

7. The method of claim 6, wherein the first carrier component is toluene.

8. The method of claim 6, wherein the second carrier component is diphenylcarbonate.

9. The method of claim 8, wherein the first carrier component is toluene.

10. The method of claim 1, wherein the first and second carrier components are present in a ratio of 4:1 to 1:4, by volume.

11. The method of claim 10, wherein the first and second carrier components are present in a ratio of about 1:1, by volume.

12. The method of claim 10, wherein the sulfonic acid ester quencher is combined with the carrier at a level of from 0.1 to 10%, by volume.

13. The method of claim 12, wherein the sulfonic acid quencher is n-butyl tosylate.

14. The method of claim 12, wherein the second carrier component is selected from the group consisting of diphenylcarbonate, phenol, bisphenol A (BPA), polycarbonate oligomers, BPA derivatives and propylene carbonate.

15. The method of claim 12, wherein the first carrier component is selected from the group consisting of xylene, toluene, benzene, chlorobenzene, anisole and ethylbenzene.

16. The method of claim 15, wherein the second carrier component is selected from the group consisting of diphenylcarbonate, phenol, bisphenol A (BPA), polycarbonate oligomers, BPA derivatives and propylene carbonate.

17. The method of claim 16, wherein the sulfonic acid quencher is n-butyl tosylate.

18. The method of claim 17, wherein the first carrier component is toluene.

19. The method of claim 17, wherein the second carrier component is diphenylcarbonate.

20. The method of claim 19, wherein the first carrier component is toluene.

21. The method of claim 1, wherein the quencher and carrier are added to the melt polycondensation product under conditions of high temperature and high vacuum.

* * * * *